(12) United States Patent
Stueckrad et al.

(10) Patent No.: US 7,765,846 B2
(45) Date of Patent: Aug. 3, 2010

(54) METHOD OF PRODUCING A HOLLOW SHAFT

(75) Inventors: Rainer Stueckrad, Alheim Baumbach (DE); Helmut Straub, Rotenburg (DE)

(73) Assignee: Neumayer Tekfor Holding GmbH, Hausach (DE)

( * ) Notice: Subject to any disclaimer, the term of this patent is extended or adjusted under 35 U.S.C. 154(b) by 15 days.

(21) Appl. No.: 12/047,679

(22) Filed: Mar. 13, 2008

(65) Prior Publication Data

US 2008/0280691 A1 Nov. 13, 2008

Related U.S. Application Data

(63) Continuation of application No. PCT/DE2006/001544, filed on Sep. 2, 2006.

(30) Foreign Application Priority Data

Sep. 13, 2005 (DE) ............... 10 2005 043 766
Feb. 17, 2006 (DE) ............... 10 2006 007 388

(51) Int. Cl.
*B21D 28/00* (2006.01)

(52) U.S. Cl. ............... 72/339; 29/DIG. 9; 29/DIG. 47; 72/370.25; 464/183

(58) Field of Classification Search .......... 72/348, 72/352, 339, 370.08–370.25; 82/1.11; 464/182, 464/183; 29/DIG. 9, DIG. 41, DIG. 47

See application file for complete search history.

(56) References Cited

U.S. PATENT DOCUMENTS 5,074,555 A * 12/1991 Meredith ............. 72/370.15 X
5,771,737 A * 6/1998 Yaegashi ............. 72/370.19

FOREIGN PATENT DOCUMENTS

| DE | 1 259 821 | | 2/1968 | |
|---|---|---|---|---|
| DE | 25 42 634 | A1 | 4/1977 | |
| DE | 40 22 692 | A1 | 1/1992 | |
| EP | 1 500 443 | A1 | 1/2005 | |
| GB | 944531 | | 2/1962 | |
| JP | 61-289935 | A * | 12/1986 | ............. 72/370.08 |
| JP | 11-320275 | A | 11/1999 | |
| JP | 2005-98516 | A | 4/2005 | |

* cited by examiner

*Primary Examiner*—Greg Binda
(74) *Attorney, Agent, or Firm*—Crowell & Moring LLP

(57) ABSTRACT

A method of producing a hollow shaft having first and second profilings provided for torque transmission at respective ends thereof, wherein a shaft section between the ends has a smaller diameter than at least one of the profilings, and the hollow shaft is assembled from hollow shaft and sleeve components joined via a torque-transmitting slip joint, in which the shaft and sleeve components are each formed from cut blanks by cupping, perforating. cold extrusion and turning steps, and the respective components are assembled to each other.

6 Claims, 3 Drawing Sheets

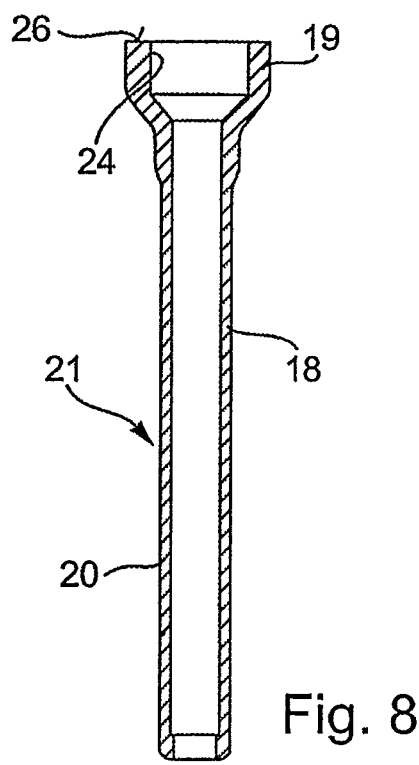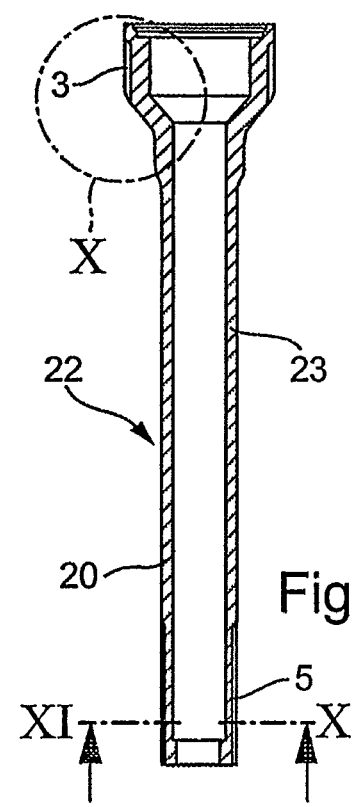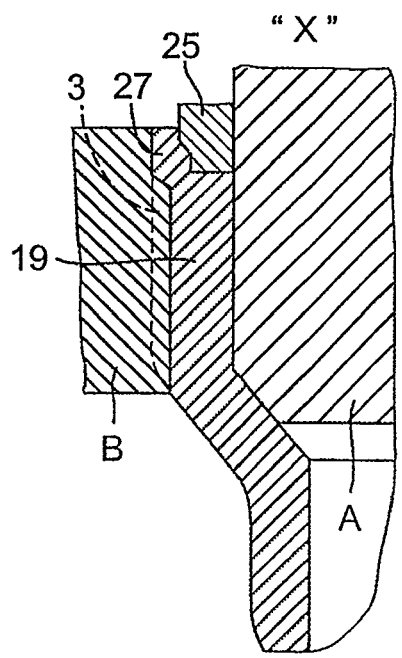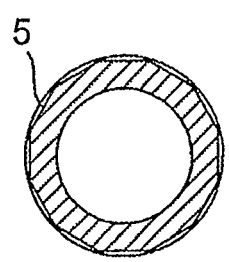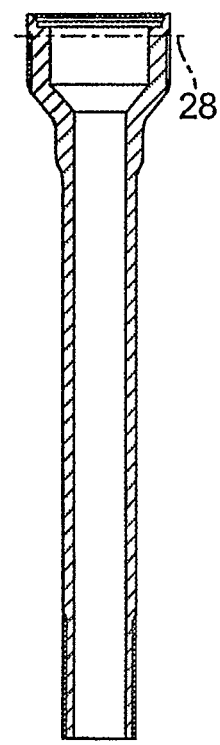
Fig. 8
Fig. 9
Fig. 10
Fig. 11
Fig. 12

METHOD OF PRODUCING A HOLLOW SHAFT

CROSS REFERENCE TO RELATED APPLICATIONS

This application is a continuation of international patent application no. PCT/DE2006/001544, filed Sep. 2, 2006 designating the United States of America, and published in German on Mar. 22, 2007 as WO 2007/031052, the entire disclosure of which is incorporated herein by reference. Priority is claimed based on Federal Republic of Germany patent application nos. DE 10 2005 043 766.4, filed Sep. 13, 2005, and DE 10 2006 007 388.6, filed Feb. 17, 2007.

BACKGROUND OF THE INVENTION

The invention relates to a hollow shaft, which has external profilings for torque transmission at its two ends, e.g., splines, wedge-shaped teeth, polygonal profiles or the like, such that the shaft sections therebetween have a smaller diameter than the profilings.

Hollow shafts of this type can be used to drive units such as oil pumps, where, for space reasons, the center section is thinner than the toothed ends.

One proposed method to produce such shafts was to form them as a single part using cold extrusion. In this case, however, one of the profilings would have to be re-expanded after the forming of the hollow shaft section. Such expansions can only be done in special, highly complex tools and require a substantial amount of additional work thereafter. This would have caused substantial additional costs.

SUMMARY OF THE INVENTION

It was therefore an object of the present invention to provide a hollow shaft of the above-described type, which is distinguished by its particularly simple, cost-effective and rapid manufacture and high precision.

A further object was to provide methods for its cost-effective, rapid and precise production.

According to the invention, these objects are achieved by a shaft assemblable or assembled from two components, one of which comprises the hollow shaft section and the one profile as well as an external torque-transmitting slip joint on the shaft side opposite the profile, and the other of which is a sleeve-like component having the second profile and an internal torque-transmitting profile of a slip joint.

It is advantageous if the hollow-shaft-type section, the profilings and the one profile of the slip joint of the one component and/or the other component are formed from a solid blank using cold extrusion.

It can be advantageous if an interference fit is provided between the internal and external profiles of the slip joint to prevent the sleeve from falling off the shaft-like section after mounting during transport, handling or assembly.

If the two profilings provided on the shaft ends have different diameters, it is advantageous if the smaller profiling is provided on the sleeve-like component and the larger profiling is integrally formed with the tubular section.

To produce the hollow shaft section with a torque-transmitting profiling, such as an external spline profile, which is formed at its one end and has a larger diameter than the shaft diameter, and a torque-transmitting external profile of a slip joint provided on the opposite shaft end, it is advantageous to provide at least some of the process steps listed below:

a) cutting a material blank from bar stock to length,
b) a first cupping to form a cup-like hollow region with a solid extension, such that the cup region corresponds at least approximately to the inside and the outside diameter of the profile section,
c) a second cupping to lengthen the hollow region from the extension using cold extrusion,
d) perforating the cup's bottom,
e) tube extrusion to begin to form the hollow shaft body using cold extrusion,
f) a first reduction of the diameter and the wall thickness and lengthening of the hollow shaft section produced in step e) and forming a neck portion that is thicker than the outside hollow shaft diameter adjoining the region intended to form the profiling, using cold extrusion,
g) a second reduction starting at least approximately from the annular neck portion and lengthening of the hollow shaft section produced in step f) using cold extrusion,
h) final pressing by cold extrusion of the profile region to form the external teeth by inserting a mandrel into the internal contour of the profile region with the same diameter, such that an annular die surrounding the mandrel penetrates the end face of the end region and thereby displaces material into the counterteeth of a die placed around the region intended to form the teeth, thereby forming an axial projection,
i) optionally and simultaneously with step h), producing the external profile of the slip joint in the region of the hollow shaft opposite the profile region using cold extrusion, and
j) removing the projection by turning.

To produce the bushing with the external profiling and an internal profile of a slip joint, at least some of the process steps listed below can be particularly advantageous:

a) cutting a material blank from bar stock to length,
b) cupping and simultaneously forming the internal profile of the slip joint, preferably to the finished profile dimension, using cold extrusion,
c) perforating the cup's bottom,
d) turning the outside diameter,
e) producing the external profile using cold extrusion by inserting a mandrel with a profile corresponding to the internal profile of the slip joint into the internal profile, such that an annular die surrounding the mandrel penetrates the end face opposite the perforated bottom and thereby displaces material into the counterteeth of a die previously placed around the region intended to form the external profile, thereby forming an axial projection, and
f) turning the bushing height to the finished dimensions and thereby removing the axial projection.

For the further production of a hollow shaft at least three of the steps listed below can be particularly advantageous, either before or after mounting or pressing the sleeve onto the shaft via the slip joint:

a) turning the portion within the profile region formed integrally with the shaft profile to form a bearing seat,
b) forming a recess in the outer end region of the profile,
c) forming a chamfer at the beginning of the internal contour in the region of the profile, and
d) forming an undercut in the end region of the cylindrical internal contour in the region of the profile.

It can be advantageous to carry out a heat treatment or surface treatment, particularly soft annealing, between some of the process steps to resoften the material whose structure was hardened by cold forming in the previous steps, e.g., when producing the hollow shaft body with the first profile formed onto it, between steps b) and c), d) and e), e) and f), f) and g), and g) and h), or, when producing the sleeve, between steps d) and e).

BRIEF DESCRIPTION OF THE DRAWINGS

The invention will be described in further detail hereinafter with reference to illustrative embodiments depicted in the accompanying drawing figures in which:

FIG. 8 is a schematic representation of the workpiece after a second diameter reduction step;

FIG. 9 is a schematic representation of the workpiece after a final pressing step;

FIG. 10 is an enlarged detail view of the area X of FIG. 9;

FIG. 11 is a cross sectional view of the workpiece taken along line XI-XI of FIG. 9;

FIG. 12 is a schematic representation of the workpiece after a length turning step;

DETAILED DESCRIPTION OF PREFERRED EMBODIMENTS

Figure 1:
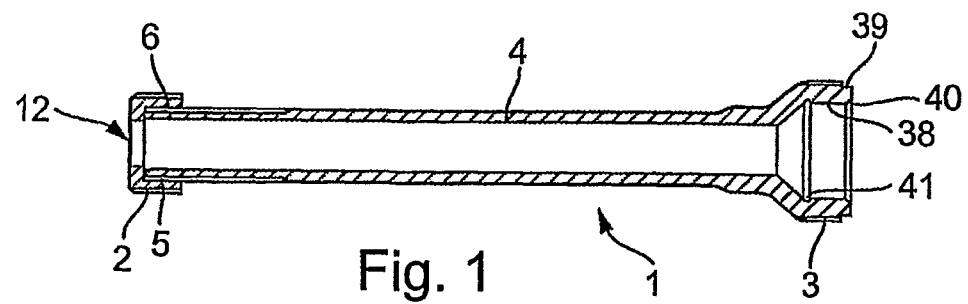
FIG. 1 shows a hollow shaft according to the invention or a hollow shaft produced using a method according to the invention.

The oil pump shaft 1 shown in FIG. 1 is a hollow shaft and has external profilings at its ends in the form of shaft profilings or splines 2, 3. Between the two profile zones 2, 3 is a tubular section 4, which, at least in partial areas, has a smaller diameter than the profilings 2, 3.

In the present example, profile 3 and the tubular section 4 are formed integrally or as a single part. Sleeve 7, which is provided with profile 2, is mounted to the end of the shaft opposite profile 3 via a torque-transmitting slip joint 5, 6, which will be described in more detail below. The slip joint 5, 6 is configured as an interference fit. The tubular section 4 and the profile section 3 integrally formed therewith as well as the sleeve 7 are produced by cold forming as described below, at least with respect to their functional areas.

Figure 2:
FIG. 2 is a schematic depiction of a blank or workpiece produced by sawing or cutting stock material.

FIG. 2 shows a blank or workpiece 8 cut to length from bar stock, in this case by sawing.

Figure 3:
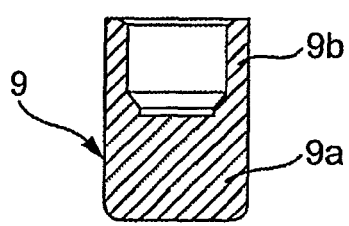
FIG. 3 is a schematic representation of the workpiece after a first cupping step.

Using a cold extrusion process, a component 9 as shown in FIG. 3 is produced from this blank in a "first cupping" process step.

Figure 4:
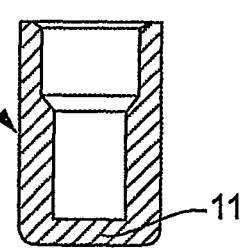
FIG. 4 is a schematic representation of the workpiece after a second cupping step.

The sleeve-like part identified by 10 in FIG. 4 is produced by cold extrusion in a "second cupping" process step.

Figure 5:
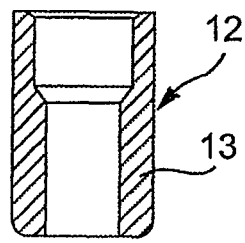
FIG. 5 is a schematic representation of the workpiece after a bottom perforating step.

In a perforation process step, the bottom 11 (see FIG. 4) of the sleeve-like component 10 is removed to create a component 12 without a bottom as illustrated in FIG. 5.

Figure 6:
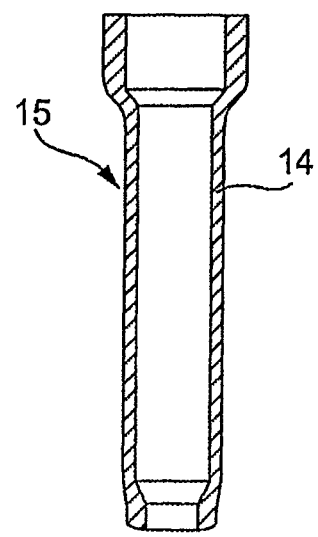
FIG. 6 is a schematic representation of the workpiece after a hollow flow pressing or tube extrusion step.

Then, in a tube extrusion or hollow flow pressing process step, material is essentially displaced from region 13 as shown in FIG. 5 to produce the hollow region 14 of component 15 as illustrated in FIG. 6.

Figure 7:
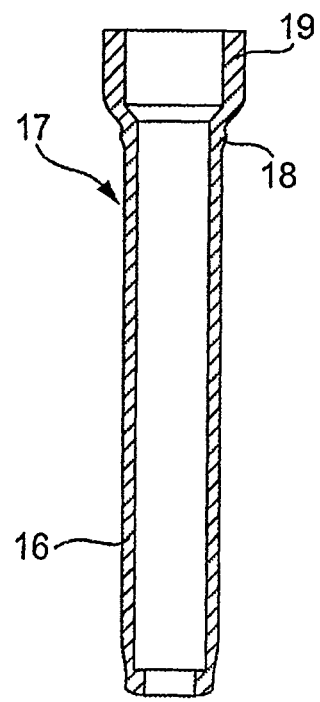
FIG. 7 is a schematic representation of the workpiece after a first size reduction and lengthening step.

In the "first reduction" process step, the hollow shaft section 16 of component 17 illustrated in FIG. 7 is essentially produced from the region 14 shown in FIG. 6. A neck portion 18 adjoining the region intended to create the profile 3 is also formed.

In a subsequent "second reduction" process step, the section identified as 16 in FIG. 7 is tapered by cold extrusion starting at least approximately from the neck-shaped portion 18 shown there, and the hollow shaft section 20 of a component 21 is produced as shown in FIG. 8.

The component 22 shown in FIG. 9 is provided in a "final pressing" process step with the external profiling 3. This external profiling 3 is clearly visible in FIG. 10, which shows an enlarged detail X of FIG. 9. In the same "final pressing" process step, profiling 5, i.e., a polygon for a torque-transmitting slip joint can be formed at the ends of the hollow shaft section 23 opposite splines 3. This detail is illustrated in an enlargement depicted in FIG. 11, which shows a section taken along line XI-XI of FIG. 9.

The profiling 3 is formed by placing a die "B", which is provided with a counterprofiling, around the profile forming region identified by reference numeral 19 in FIG. 8. A mandrel "A" is then inserted into the interior contour of region 19 and an annular die—a part of which, identified as 25, is shown in FIG. 10—is driven or forced against the end face 26 (see FIG. 8), penetrates region 19 and displaces material into the teeth of the die to form teeth 3. In this process, a projection 27 is also formed, as may be seen particularly in FIG. 10.

The projection 27 is removed by turning at line 28 in a "length turning" process step to form the hollow shaft as illustrated in FIG. 12 with its region 4 and the splined region 3 integrally provided thereon and with the external profile 6 of a slip joint as shown in FIG. 1.

The sleeve 7 with external profile 2 and external profile 6 of a slip joint is produced as illustrated in FIGS. 13 to 19.

Figure 13:
FIG. 13 is a schematic depiction of another blank or workpiece produced by sawing or cutting stock material.

In a sawing or cutting process step, a blank 30 is formed as illustrated in FIG. 13.

Figure 14:
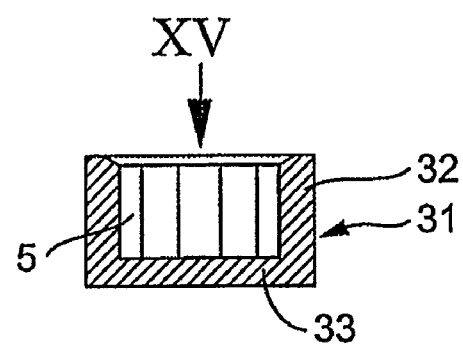
FIG. 14 is a schematic representation of the workpiece after a cupping step.

A cup-shaped component 31 with a cylindrical region 32 and a bottom 33 as illustrated in FIG. 14 is produced in a cold extrusion "cupping" process step. The internal profile 5 of the torque-transmitting slip joint in the form of a polygon also is produced in the cold extrusion step illustrated in FIG. 14.

Figure 15:
FIG. 15 is a top view of the workpiece in the direction of arrow XV of FIG. 14.

The interal profiling 5 is clearly visible in FIG. 15, which shows a top view in the direction of arrow XV-XV in FIG. 14.

Figure 16:
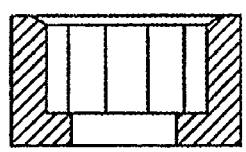
FIG. 16 is a schematic representation of the workpiece after a bottom perforating step.

The bottom 33 (see FIG. 15) of the workpiece is partly removed in a "perforation" process step as illustrated in FIG. 16.

Figure 17:
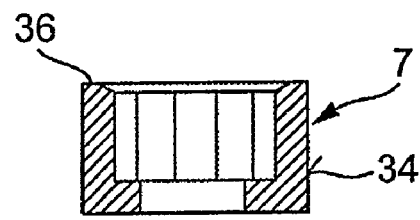
FIG. 17 is a schematic representation of the workpiece after a first turning step.
Figure 18:
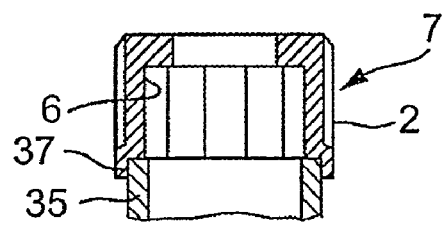
FIG. 18 is a schematic representation of the workpiece after a tooth forming and reducing step.

In a "first turning" process step, the outside diameter 34 of the sleeve-like component 7 illustrated in FIG. 17 is turned.

Figure 19:
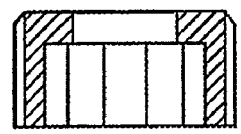
FIG. 19 is a schematic representation of the workpiece after a second turning step.

In the "tooth forming and reducing" process step, the external profile 2 shown in FIG. 19 is produced in essentially the same manner as the process step for producing profile 3 illustrated in FIG. 9.

In the process step in which sleeve 7 is provided with the toothed profile 2 shown in FIG. 19, a mandrel corresponding to profiling 5 is again axially inserted into profile 5 and an annular die 35 drives against the end face 36 (FIG. 18), such that material from the end face region is displaced by cold extrusion into the counterprofile of a die, which is provided with the countershape of profiling 2 and which is placed around the cylindrical outside diameter 34. A projection 37 created in this process is removed in a "second turning" process step as illustrated in FIG. 19.

Region 38, which may serve as a bearing seat, can be formed by turning before, or even after, assembly of components 4 and 7. A recess 39 is turned in the outer end region of profile 3. Likewise, a chamfer 40 and an undercut 41 are turned at the end of the cylindrical region 38.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A method of producing a hollow shaft component having a profiling provided for torque transmission at one end thereof, wherein a shaft section between the ends has a smaller diameter than said profiling, said method comprising forming a hollow shaft component having at one end thereof the torque-transmitting profiling and at the other end thereof an external torque-transmitting profile of said a slip joint from a workpiece by:
   a) cutting a material blank from bar stock,
   b) subjecting the cut blank to a first cupping wherein a cup-like hollow region with a solid extension is formed by cold extrusion and wherein the cup-like hollow region corresponds at least approximately to the inside diameter and the outside diameter of a profile region intended for forming the profiling,
   c) subjecting the blank to a second cupping, wherein the hollow region is lengthened from the extension by cold extrusion,
   d) perforating the bottom of the cup resulting from c) to form a tube,
   e) cold extruding the tube to commence formation of a hollow shaft section,
   f) reducing the diameter and wall thickness of the hollow shaft section in a first reduction step and lengthening the hollow shaft section and forming a neck portion that is thicker than the outside hollow shaft diameter adjoining the profile region using cold extrusion,
   g) starting from said neck portion, further reducing the diameter and lengthening the hollow shaft section in a second reduction step using cold extrusion,
   h) final pressing the profile region to form the profiling thereon in the form of external teeth by inserting a mandrel with the same diameter into the internal contour in the profile region and forcing an annular die surrounding the mandrel into the end face of the profile region and thereby displacing material into counterteeth of an annular counterprofile die placed around the profile region to form the external teeth of the profiling and an axial projection by cold extrusion,
   i) forming the external profile of said slip joint, optionally simultaneously with step h), in the section of the hollow shaft opposite the profile region by cold extrusion, and
   j) removing the projection by turning.

2. A method as claimed in claim 1, wherein said torque-transmitting profiling comprises external splines.

3. A method as claimed in claim 1, further comprising heat treating the workpiece.

4. A method as claimed in claim 3, wherein said heat treating is soft annealing.

5. A method as claimed in claim 3, wherein said heat treating is carried out between steps b) and c), or between steps d) and e), or between steps e) and f), or between steps f) and g), or between steps g) and h).

6. A method of producing a hollow shaft having first and second profilings provided for torque transmission at respective ends thereof, wherein a shaft section between the ends has a smaller diameter than at least one of the profilings, and the hollow shaft is assembled from components joined via a torque-transmitting slip joint, said method comprising:
   forming a hollow shaft component having at one end thereof a torque-transmitting profiling with a larger diameter than the shaft diameter and at the other end thereof an external torque-transmitting profile of said slip joint from a workpiece by:
   a) cutting a material blank from bar stock,
   b) subjecting the cut blank to a first cupping wherein a cup-like hollow region with a solid extension is formed by cold extrusion and wherein the cup-like hollow region corresponds at least approximately to the inside diameter and the outside diameter of a profile region intended for forming the profiling,
   c) subjecting the blank to a second cupping, wherein the hollow region is lengthened from the extension by cold extrusion,
   d) perforating the bottom of the cup resulting from c) to form a tube,
   e) cold extruding the tube to commence formation of a hollow shaft section,
   f) reducing the diameter and wall thickness of the hollow shaft section in a first reduction step and lengthening the hollow shaft section and forming a neck portion that is thicker than the outside hollow shaft diameter adjoining the profile region using cold extrusion,
   g) starting from said neck portion, further reducing the diameter and lengthening the hollow shaft section in a second reduction step using cold extrusion,
   h) final pressing the profile region to form the profiling thereon in the form of external teeth by inserting a mandrel with the same diameter into the internal contour in the profile region and forcing an annular die surrounding the mandrel into the end face of the profile region and displacing material into counterteeth of an annular counterprofile die placed around the profile region to form the external teeth of the profiling and an axial projection by cold extrusion,
   i) forming the external profile of said slip joint, optionally simultaneously with step h), in the section of the hollow shaft opposite the profile region by cold extrusion, and
   j) removing the projection by turning; and
   forming a sleeve component having a torque-transmitting external profiling at one end thereof and an internal profile of a slip joint at the other end thereof from a workpiece by:
   a') cutting a material blank from bar stock to length,
   b') subjecting the cut blank to a cupping step and simultaneously forming an internal profile of the slip joint by cold extrusion, c') perforating the bottom of the cupped blank,
d') turning the outside diameter of the workpiece,
e') producing the external profiling by cold extrusion, by inserting a mandrel with a profile corresponding to the internal profile of the slip joint into the cupped workpiece, and forcing an annular die surrounding the mandrel into the end face opposite the perforated bottom to displace material of the workpiece into counterteeth of a counterprofile die placed around the region intended to form the external profiling, whereby the external profiling and an axial projection are formed, and
f') turning the sleeve height to finished dimensions and simultaneously removing the axial projection; and
assembling the hollow shaft and sleeve components to each other by inserting the external profile of the slip joint into the internal profile of the slip joint.

* * * * *